United States Patent [19]

Price

[11] Patent Number: 4,693,158

[45] Date of Patent: Sep. 15, 1987

[54] FENCE SYSTEM WITH A STOP MECHANISM

[76] Inventor: T. David Price, 648 Turin St., S. St. Paul, Minn. 55075

[21] Appl. No.: 855,844

[22] Filed: Apr. 24, 1986

[51] Int. Cl.[4] ............................................. B27B 27/10
[52] U.S. Cl. ...................................... 83/468; 83/698; 144/253 R; 144/287; 269/303
[58] Field of Search .......................... 83/467, 468, 698; 269/303, 304, 236, 315; 144/253 R, 287

[56] References Cited

U.S. PATENT DOCUMENTS

| | | | |
|---|---|---|---|
| 2,498,865 | 2/1950 | Snow | 83/468 |
| 2,747,625 | 5/1956 | Small | 143/174 |
| 2,779,360 | 1/1957 | Snow | 144/253 R |
| 2,787,301 | 4/1957 | Anderson | 83/468 |
| 2,890,729 | 6/1959 | Horn | 143/168 |
| 3,348,591 | 10/1967 | Carrasco | 143/168 |
| 3,994,484 | 11/1976 | Scherr | 269/315 |
| 4,206,910 | 6/1980 | Biesemeyer | 269/315 |
| 4,256,000 | 3/1981 | Seidel | 83/468 |
| 4,341,247 | 4/1982 | Price | 144/287 |
| 4,494,430 | 1/1985 | Bautista et al. | 83/468 |

OTHER PUBLICATIONS

Brochure "T-Square Cut-Off Saw Stop", Biesemeyer Mfg. Corporation, 216 S. Alma School Rd., Suite 3, Mesa AZ 85202.
Brochure "Leaver Index/Stop Gauge", Idaco, 1300 7th Street, Oakland, CA 94607.
Brochure "Simi-Automatic Cut-Off Saw Model 1000", Whirlwind, Inc., 4302 Shilling Way, Dallas, TX 75237.

*Primary Examiner*—W. D. Bray
*Attorney, Agent, or Firm*—Merchant, Gould, Smith Edell, Welter & Schmidt

[57] ABSTRACT

A workpiece stop mechanism (20, 50) for use with a fence (50, 60), is disclosed. The stop mechanism (20) includes a body member defining an opening for enabling the body member to be inserted on and removed from the fence (50) and for sliding on the fence (50). The body member has a view plate (24) that is cooperatively connected for viewing a measuring device (57). A gate member (30) and eccentric (31) provide for pivoting the gate member between an open and closed position wherein when in the closed position the gate (30) is engaged with the fence (50) and thereby securing the gate (50) and body to the fence (50). The fence (50) includes a body member (51) adapted to be secured to a work surface and an upright member (55) cooperatively connected to the bottom member (51). An angled extension member (56) is cooperatively connected to a top portion (55c) at an angle from approximately 30° to 60° and preferably at an angle of approximately 45°.

21 Claims, 11 Drawing Figures

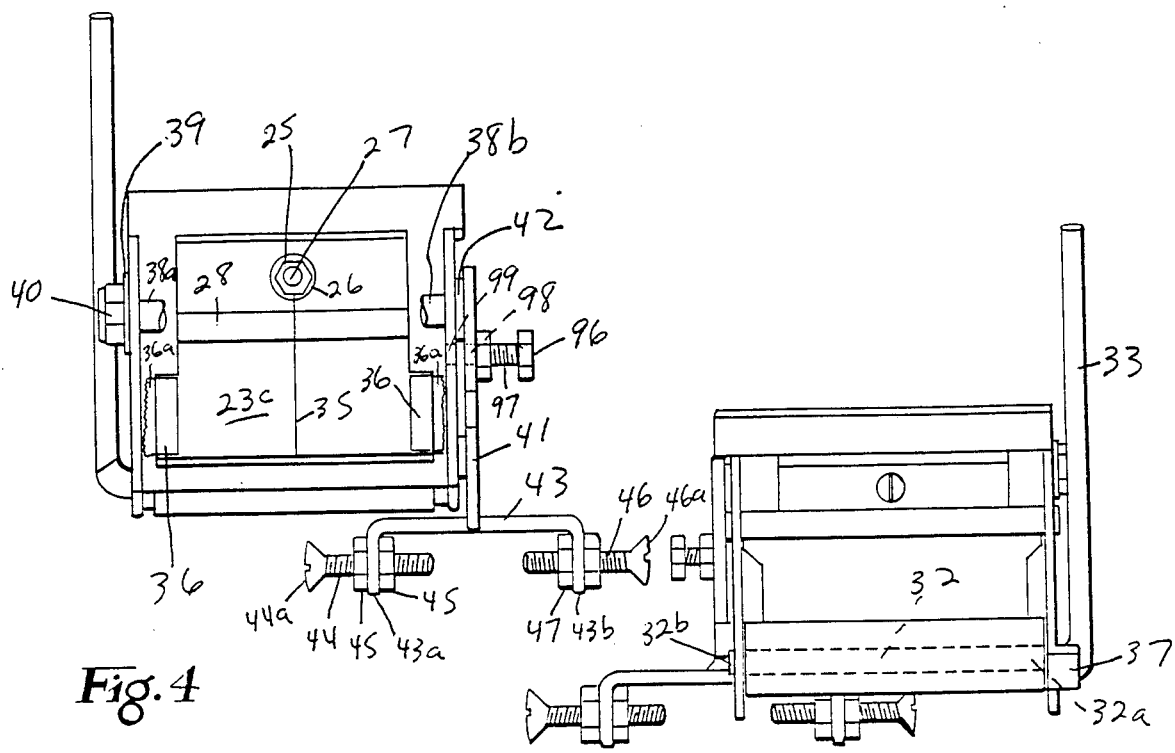
Fig. 4
Fig. 5
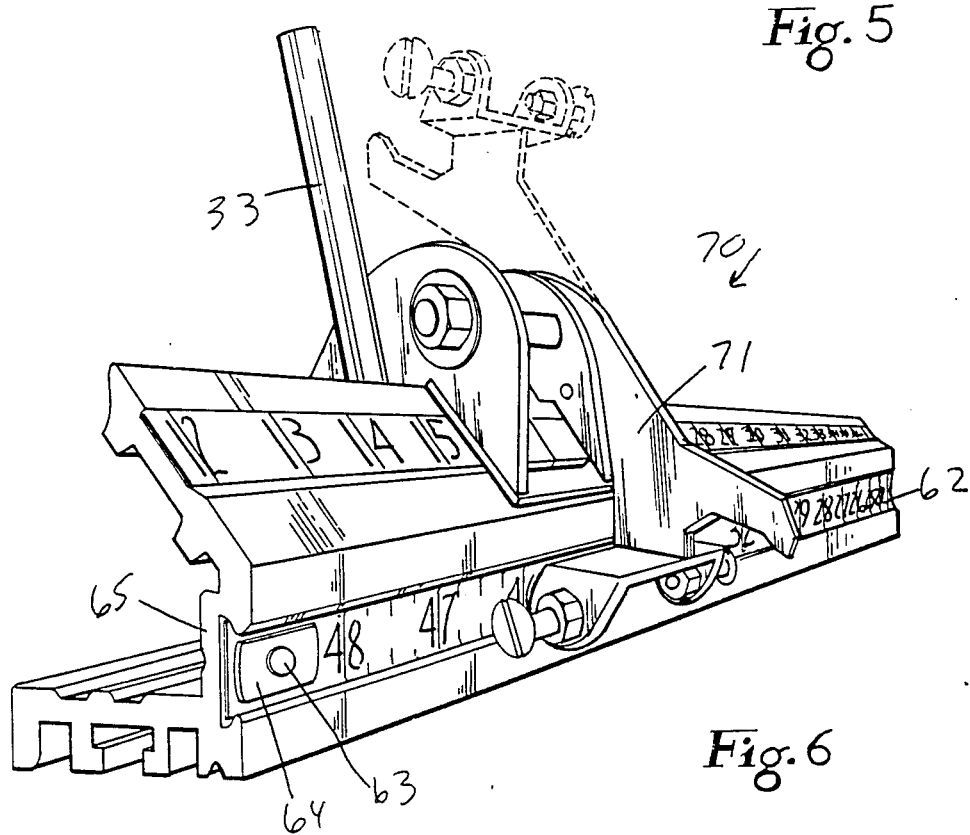
Fig. 6

FENCE SYSTEM WITH A STOP MECHANISM

BACKGROUND OF INVENTION

1. Field of the Invention

This invention relates generally to a fence system for use with power tools, and more particularily to an improved fence system having a stop mechanism.

2. Description of the Prior Art

Power tools, such as radial arm saws, power miter boxes, drill presses, band saws and a wide variety of other tools often require an elongated support surface for holding the workpiece being acted on by the power tool which is significantly longer than the relatively short workpiece holding surface generally provided by the manufacturer supplied table of the power tool. For such power tools, the workpiece holding table provided by the manufacturer of the power tool typically extends only one or two feet on either side of the power tool working head member. Use of such tools, however, often require work to be performed upon a substantially elongated workpiece. In addition, the holding table provided by the manufacturer also makes it quite difficult to accurately measure the workpiece being cut on the elongated support surface. This is because the elongated support surface is not able to be placed next to the working head member to obtain an accurate measurement.

One such elongated extension table is disclosed in my prior U.S. Pat. No. 4,341,247 issued July 27, 1982. The disclosed extension table assembly for power tools provides a versatile extension table that is rapidly and simply attached to a power tool apparatus. However, it is often useful to have a stop mechanism attached to the extension table to allow precision cutting at various lengths to be performed on the workpiece. In addition, when repeated cuts are made using the power tool, there tends to be a build up of saw dust on any flat surface.

U.S. Pat. No. 2,787,301 issued Apr. 2, 1957 to R. W. Anderson, discloses a table saw miter gauge which includes a slide that has a stop that can be flipped between an operative and non-operative position. However, a screw is used to secure the slide in position. Such an action does not immediately lock the slide in position and it is quite probable that the slide may move during the securing process.

The present invention addresses the problems of the prior art devices and also provides for improvements that are utilized in the construction of an improved fence system having a stop bar mechanism.

SUMMARY OF THE INVENTION

A workpiece stop mechanism for use with a fence for power tools, the fence having a measuring device extending along the length of the fence, is disclosed. The mechanism includes a body member defining an opening for enabling the body member to be inserted on and removed from the fence and for sliding on the fence. The body member has a view plate that is cooperatively connected to the body member for viewing the measuring device. Means for stopping the workpiece is also included. The stopping means is cooperatively connected to the body member. Means for securing the body member to the fence is also provided. The securing means includes a gate member pivotally mounted to the body member proximate the opening and a means for pivoting the gate member between an open and a closed position, wherein when in the closed position the gate is engaged with the fence and thereby securing the gate and the body to the fence. In a preferred embodiment, the pivoting means includes an eccentric pivotally mounted to the housing and a lever arm cooperatively connected to the eccentric, wherein rotation of the lever arm rotates the eccentric causing the gate to rapidly and securly engage the fence.

The invention also includes a fence system for use with a power tool having a work surface. The fence system includes a generally planar elongated body member adapted to be secured to the work surface and an upright member, generally perpendicular to the bottom member, the upright member cooperatively connected to the bottom member. The upright member has a front side, back side and a top portion. An extension member is cooperatively connected to the top portion and extends generally upward and away from the top portion towards the back side. A first means for receiving a first measuring device is provided in the extension member and a second means for receiving a second measuring device is provided for in the fence system. In a preferred embodiment, the extension member extends upward at an angle from approximately 30° to 60° and preferably at an angle of approximately 45°.

Further, the invention includes a combination of the workpiece stop mechanism and fence systems discussed above.

BRIEF DESCRIPTION OF THE DRAWINGS

FIG. 4 is a top view of the stop mechanism shown in FIG. 1;

FIG. 5 is a bottom plan view of the stop mechanism shown in FIG. 1;

FIG. 6 is a perspective view of a second embodiment of a fence system having a stop mechanism according to the present invention;

DETAILED DESCRIPTION OF THE INVENTION

Figure 1:
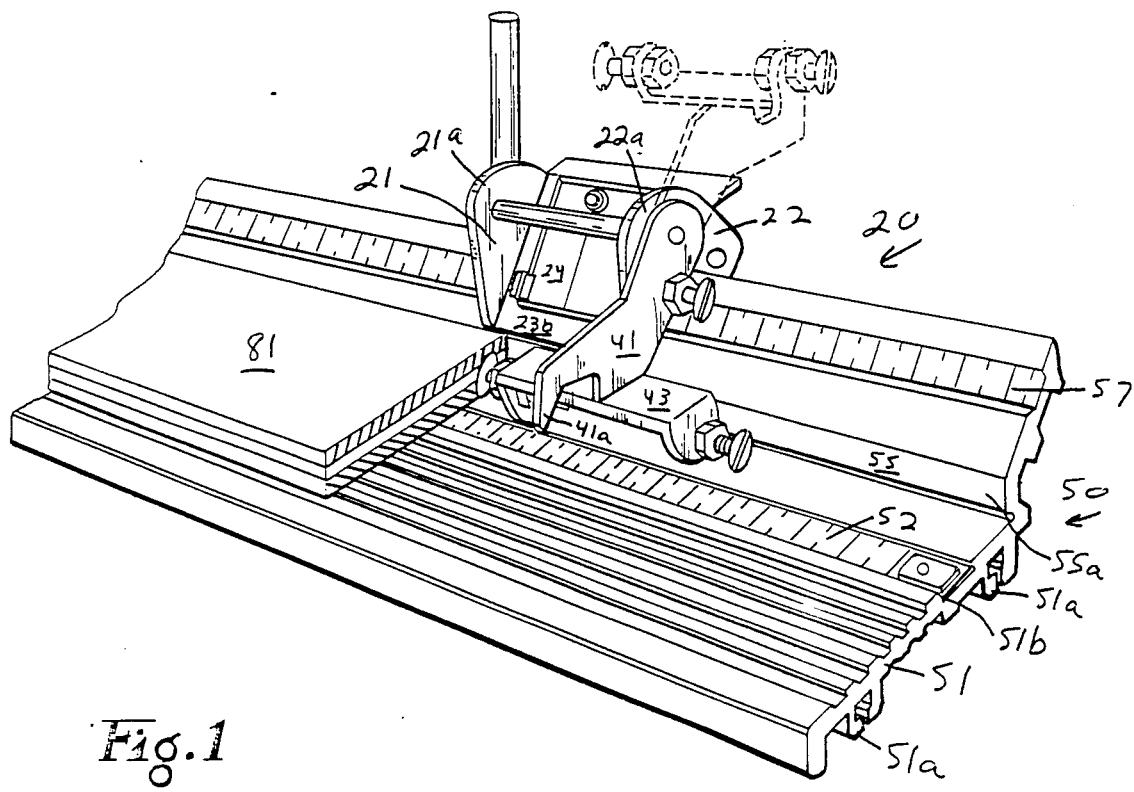
FIG. 1 is a perspective view of a fence system and workpiece stop mechanism as constructed according to the principals of this invention.

Referring to the drawings, wherein like numerals represent like parts throughout the several views, there is generally disclosed at 20 a workpiece stop mechanism. The workpiece stop mechanism 20 has a first generally C-shaped end plate 21 cooperatively connected to a second C-shaped end plate 22 by means of a top plate 23 to form the body of the stop mechanism 20.

Figure 2:
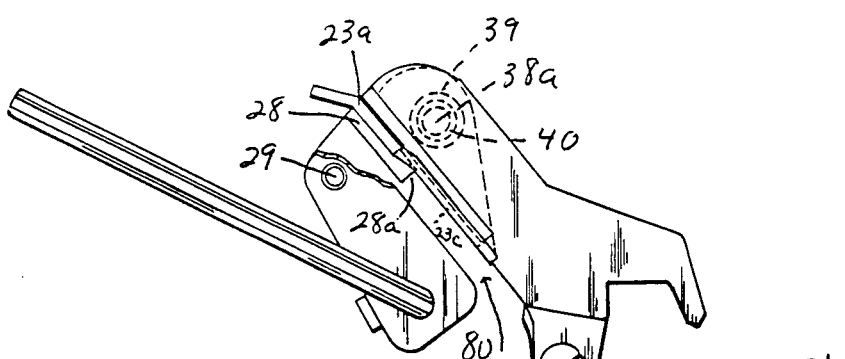
FIG. 2 is a view in left side elevation of the stop mechanism shown in FIG. 1.
Figure 3:
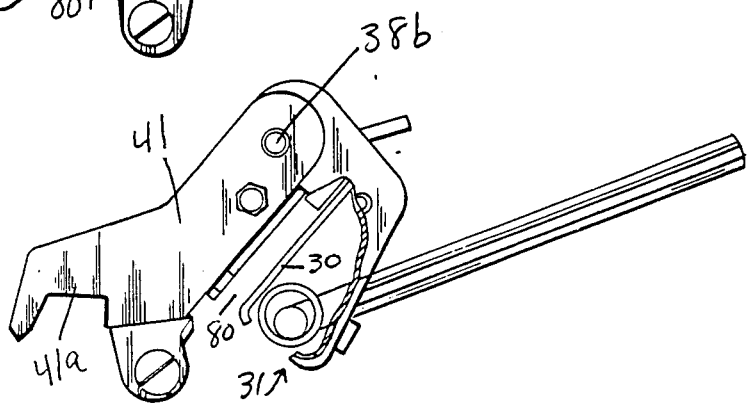
FIG. 3 is a view in right side elevation of the stop mechanism shown in FIG. 1 with a portion thereof broken away.

The end plates 21 and 22 have protruding flange members 21a and 22a, respectively which extends above the top surface of the top plate 23. The end plates 21 and 22 may be cooperatively connected to the top plate 23 by any suitable means, such as welding. The top plate 23 has a downwardly depending flange 23a and a top portion 23b which, in a preferred embodiment, both the downwardly depending flange 23a and the top portion 23b are intregal. The top portion 23b has a opening 23c. A transparent view plate 24 is secured over the opening 23c and is secured in position over the downwardly depending flange 23a by means of a nut 25, washer 26 and bolt 27. A bearing member 28 is cooperatively connected to the underneath side of the top portion 23b also by means of the nut 25, washer 26 and bolt 27. As most clearly shown in FIGS. 2 and 3, the bearing member 28 extends within the generally U-shaped slot 80 formed by the end plates 21 and 22 and top plate 23. The bearing member 28 has a bearing surface 28a, whose edge is seen in FIGS. 2 and 3, that provides a surface for the stop mechanism 20 to slide on a fence. The bearing member 28 may be formed of any suitable material, such as a hard plastic. A rod 29 is rotatably mounted in end plates 21 and 22 by insertion through holes formed in the end plates 21 and 22. Cooperatively connected to the rod 29 by suitable means, such as welding, is a gate member 30. The gate member 30, along with the bottom surface of the top portion 23b form the elongate sides of the U-shaped opening 80 formed by the body of the stop mechanism 20.

An eccentric, generally designated at 31 is rotatably mounted in the lower portion of the end plates 21 and 22. The eccentric 31 includes a shaft 32 having a first end 32a carried by a hole in the end plate 21 and a second end 32b carried in a hole in the end plate 22. Cooperatively connected to the first end 32a is a lever arm 33. Positioned inside the end plates 21 and 22 is a cylinder 34. The cylinder 34 is cooperatively connected to the shaft 32 along the inner wall of the cylinder 34. A rotation of the shaft 32 caused by movement of the lever arm 33 wil also cause a rotation of the cylinder 34. The rotation of the cylinder 34 causes movement of the gate 30 toward the bottom surface of the top portion 23b.

A hairline 35 is shown on the view plate 24. In addition, dust seals 36 are cooperatively connected underneath the view plate 24 (see FIG. 4). One means of cooperatively connecting the dust seals in place is to simply have a portion of the dust seal extend underneath the view plate 24 and then bring a portion of the dust seal 36 upwards in the opening 23c between the end of the view plate 24 and the edge of the opening 23c. This may be a force fit and, if desired, reinforced with glue to position the dust seal. The dust seal may have a looped portion 36a which is adapted to engage and wipe free any dust that may be on a measuring device, as will be more fully described herafter. A limit member 37 is cooperatively connected to the bottom portion of end plate 21c to prevent rotation of the lever 33 passed a given point.

Rotatably mounted to the body of the stop mechanism 20 is a rotatable shaft 38 which extends through holes in the protruding flange portions 21a and 22a of the end plates 21 and 22. At a first end 38a is fastened a washer 39 and bolt 40. The tension of the stop bar (ease of lifting or pivoting the bar) may be adjusted by tightening nut 40 (FIG. 2). A stop bar 41 is cooperatively connected to the second end of the shaft 38b by suitable means such as welding. A washer 42 may be inserted between the end plate 22 and the stop bar 41 to allow for easier rotation of the shaft 38. The stop bar is generally angled downward and outward a sufficient amount to allow for the stop bar plate 43 to extend beyond the front edge of the end plates 21 and 22. The stop bar plate has a first downwardly depending flange 43a having a hole therethrough and a second downwardly depending flange 43b also having a hole extending therethrough. A stop bar fine adjusting bolt 44 is secured to the first flange 43a by means of two nuts 45. Another stop bar fine adjusting bolt 46 is cooperatively connected through the hole in the second flange 43b by means of nuts 47.

A lockdown bolt 97 is threaded into the jamb nut 96 and, upon turning, can be inserted into a threaded hole 98 in the stop bar 41. The jamb nut 96 will prevent the bolt 97 from turning due to vibration. If it is desired to lock stop bar 41 in position so it can not be raised, then bolt 97 is turned into a hole 99 in the end plate 22. When the lockdown bolt extends into the hole 99, the stop bar 41 is secured into position and may not be moved upward without the backing out of the bolt 97.

A second embodiment of a workpiece stop mechanism, generally designated as 70 is shown in FIG. 6. The details of construction of the second embodiment of the stop mechanism 70 will not be discussed in detail as the stop mechanism 70 is identical to the stop mechanism 50 except for the configuration of the stop bar 71. The stop bar 71 is configured to take into account the different shape of the fence 60 as opposed to the fence 50 on which the stop mechanism 20 is shown. This is configured so that the stop bar plate 73, which is identical to the stop bar plate 43 is capable of being raised to an open position, as shown in phanton, to a operating position as shown in FIG. 6 without hitting the fence 60.

Figure 10:
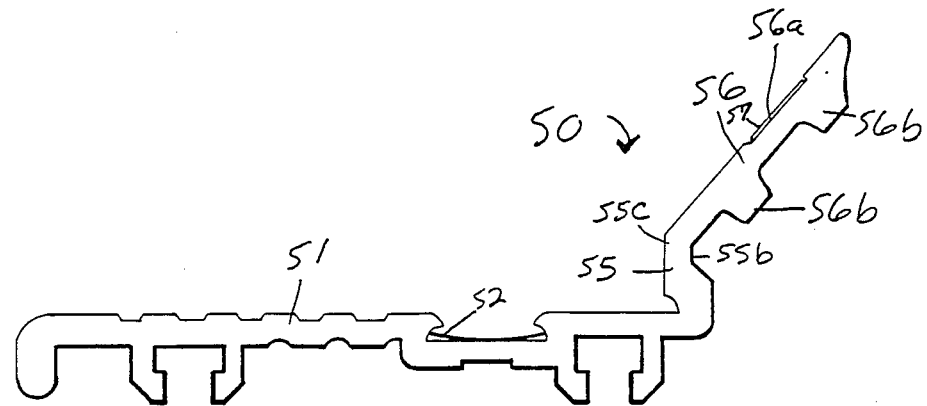
FIG. 10 is a side elevational view of the fence shown in FIG. 1.
Figure 11:
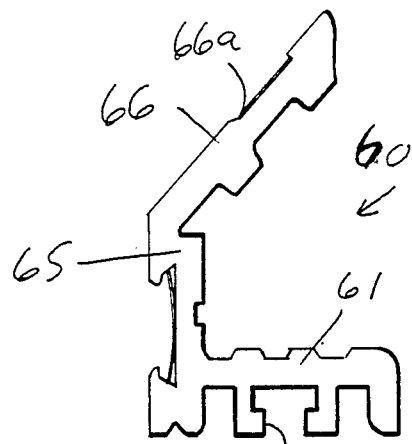
FIG. 11 is a side elevational view of the fence shown in FIG. 6.
Figure 1:
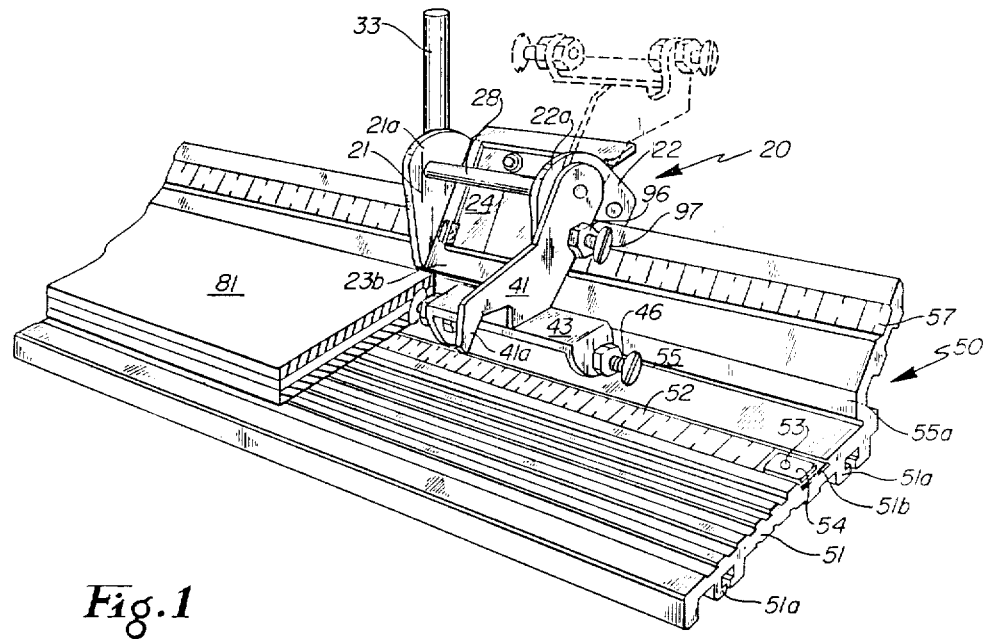
Figure 2:
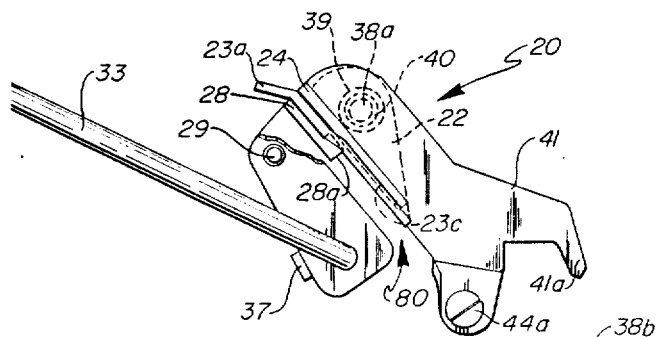
Figure 3:
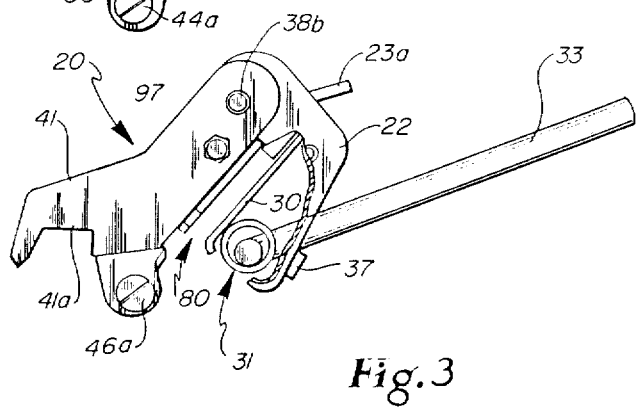
Figure 7:
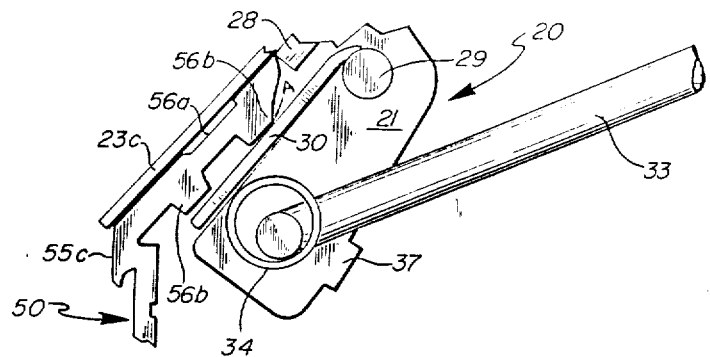
Figure 8:
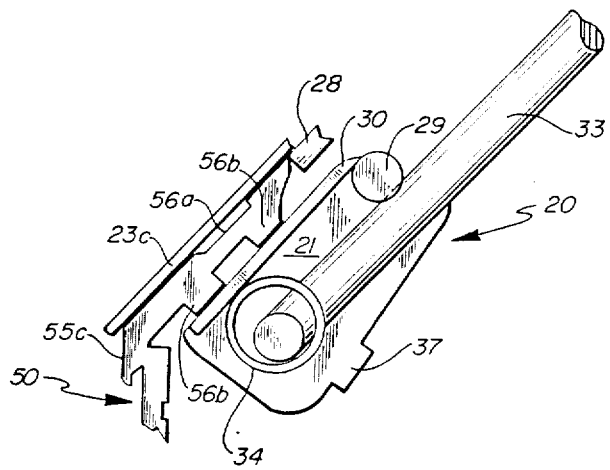
Figure 9:
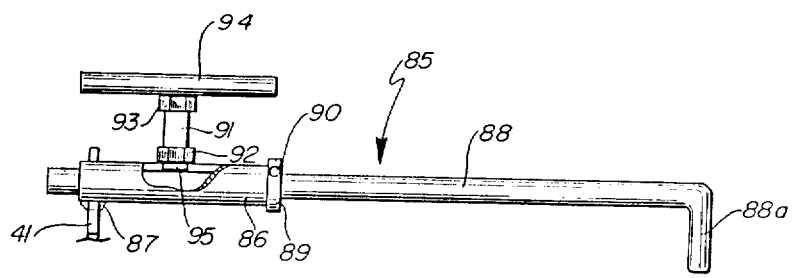
Figure 10:
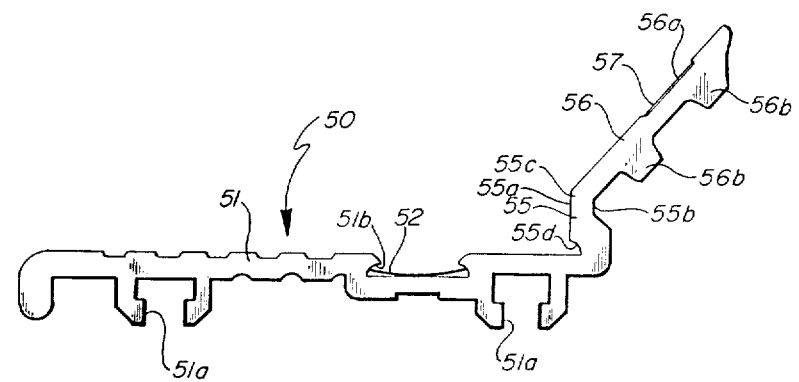
Figure 11:
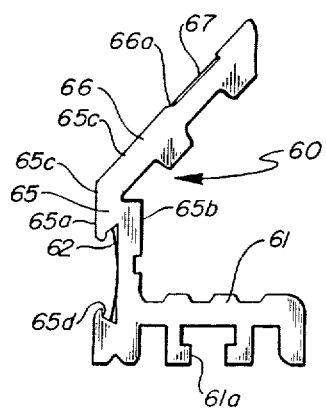

A fence, generally disclosed as 50, is shown in FIGS. 1 and 10. The fence 50 has a generally planar elongate body member 51. The bottom member 51 has bolt channels 51a extruded on its underneath side to enable the bottom member 51 to be secured to a working surface or folding legs and connector mechanisms as described in my earlier patent U.S. Pat. No. 4,341,247 by means of bolts. The head of a bolt simply slides through the bolt channels 51a and then fastened to the working surface (not shown). A plurality of grooves may also be extruded on the top surface of the bottom member 51. A slot 51b is also extruded in the bottom member 51 to provide for a place to insert a measuring device such as a tape measure 52. A screw 53 and end plate 54 may be used to secure the tape measure 52 in position through a hole (not shown) in the slot 51b. An upright member 55, generally perpendicular to the bottom member 51 is cooperatively connected to the bottom member 51. The upright member has a front side 55a, backside 55b and top portion 55c. In addition, a sawdust groove 55d may be provided. An angled extension member 56 is cooperatively connected to the top portion 55c and extends generally upward and away from the top portion 55c. A slot 56a is provided in the extension member 56 for receiving a measuring device such as a tape measure 57. This tape measure 57 could be either mounted as is the tape measure 52 or more preferably permanently mounted by means of an adhesive in the slot 56a. Preferably, the extension member extends upward at an angle from approximately 30° to 60° and preferably at an angle of approximately 45°. In a preferred embodiment, the entire fence 50, not including the tape measures 52 and 57 are made of a one piece extrusion of aluminum.

It is, of course, understood that other suitable materials or methods of manufacture may be utilized.

Figure 9:
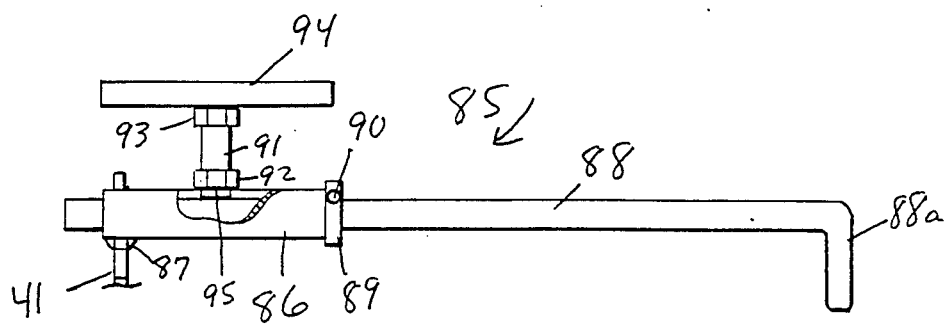
FIG. 9 is a side elevational view of an extension rod for attachment attached to a stop bar.

An extension bar assembly, generally designated as 85, is shown in FIG. 9. The extension bar assembly 85 includes a hollow sleeve 86 having an inner bore through which a rod is inserted. The rod 88 has a downwardly depending end portion 88a that is perpendicular to the main portion of the rod 88. The rod is sized such to slide within the bore of the sleeve 88. A collar 89 having a set screw 90 is held in position around the rod 88 by means of the set screw 90. The collar 89 is positioned at any given length, depending upon the power tool with which it is used. A threaded sleeve 91 is cooperatively connected to the sleeve 86 by any appropriate means. As shown in FIG. 9, a nut 92 is welded to the sleeve 86 and the sleeve 91 attached to the nut 92. A T-handle 94 having a threaded shaft 95 is rotatable inside the threaded bore of the sleeve 91. The T-handle 94 is simply rotated and the threaded shaft 95 engages the rod 88 and holds it in position. The extension bar assembly 85 is cooperatively connected to the stop bar mechanism 20 by any appropriate means such as a weld 87.

Another embodiment of a fence is generally shown at 60. The fence 60 has a generally planar elongated bottom member 61 having bolt channels 61a similar to bolt channels 51a. An upright member 65 is generally perpendicular to the bottom member 61 and is cooperatively connected thereto. The upright member 65 has a front side 65a, back side 65b and top portion 65c. A slot 65d is provided in the upright member 65 for receiving a tape measure 62. The tape measure may be secured using a suitable screw 63 and clamp 64. An angled extension member 66 is cooperatively connected to the top portion 65b of the upright member 65 and extends generally upward and away from the top portion 65c at an angle of approximately 30° to 60° and preferably at an angle of approximately 45°. The extension member 66 has a slot 66a for receiving a tape measure 67 that may either be cooperatively connected in the slot by means of a screw and clamp similar to 63 and 64 or, preferably, permanently affixed by means of an adhesive.

In operation, the fence 50 is secured to a working surface (not shown) of the power tool or to folding legs and connector mechanism as described in my earlier patent U.S. Pat. No. 4,341,247. The fence 50 may be secured by any suitable means such as by use of the bolt channel 51a. Further, fence 70 may utilize bolts or clamps to be secured to the work table. In addition, it is also possible to use the coupling apparatus described in U.S. Pat. No. 4,341,247, which is hereby incorporated by reference, by making a suitable modification, such as in the coupler mechanism Model PB as sold by American Design and Engineering Inc., South St. Paul, Minn. Depending on the distance that the edge of the fence 50 is away from the working head of the power tool, the tape measure 57 is placed in position so that the tape measure 57 will reflect the true and accurate distance from the working head itself to the head 44a or 46a, depending on which side of the saw the user is on. That is, if the end of the fence is, due to the constuction of the power tool, ten inches away from the working head, the tape measure 57 would be oriented such that the tape measure read ten inches beneath the hairline when the head 44a or 46a is ten inches from the working head. The second tape measure 52 is then placed in position in the slot 51b. The tape 52 is adjustable such that different settings may be used when the fence 50 is used in conjunction with different power tools. Or, it is possible to align the second tape 52 to coincide with the measurements on the tape 57. For a number of radial arm saws and similar equipment, when they are used to cut at an angle, the working head does not pivot at the center of the working head. Therefore, any measurements that are taking on the measure 57 may be off by a fraction of an inch. This could be compensated for by simply offsetting the second tape 52 by an appropriate fraction of an inch and use the second tape 52 for such cuts. Also, additional hairlines may be scribed on the view plate to compensate for such differential measurements created by angled cuts. Still further, the tape measure 52 could be in a reverse orientation, as shown in FIG. 6, so that the fence 50 may be positioned between two power tools and the stop mechanism 20 may be used from either direction so that only one stop mechanism 20 is needed for both power tools.

Figure 7:
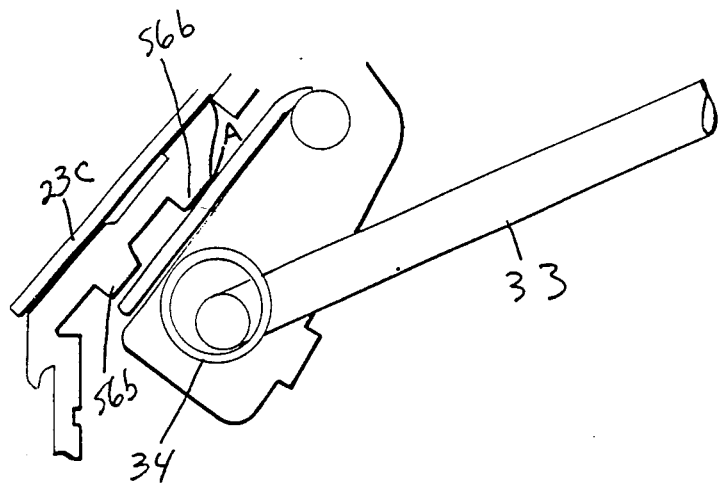
FIG. 7 is a partial cross sectional view of the fence system and stop mechanism of FIG. 1 showing the gate in an intermediate position.
Figure 8:
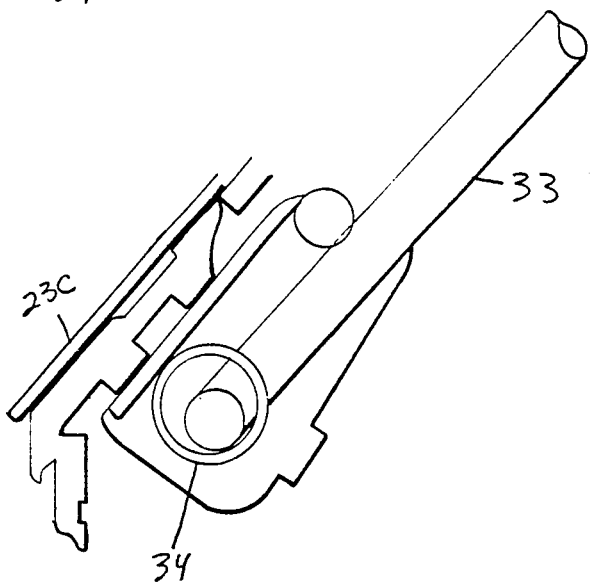
FIG. 8 is a partial cross sectional view of the fence system and stop mechanism of FIG. 1 showing the gate in a closed position.

The stop mechanism 20 is inserted on top of the angle extension member 56 by orienting the generally U-shaped slot 80 on the extension member 56. The stop mechanism 20 is free to slide back and forth on the bearing surface 28a as long as the gate member 30 is in an open position. The ruler 57 is visable through the view plate 24 and the hairline 35 is positioned over the desired measurement. FIG. 3 shows the gate member 30 in an open position. In this position, the distance between the gate member 30 and the bottom surface of the top portion 23b is greater than the thickness of the extension member 56. FIG. 7 shows the gate member 30 in an intermediate position after the lever arm 33 has been rotated upwards. This causes the gate member 30 to quickly and accurately engage the back of the extension member 56 at point A. This point A as shown in FIG. 7 is actually a line that extends along the back of the extension member 56. Because of the action of the eccentric 31 the gate member is quickly brought into contact with the extension member 56. In addition, the lever arm 33 provides for the application of a large amount of force to tighten the gate member 30 against the extension member 56. Upon further rotation of the lever arm 33, the cylinder 34 continues to urge the gate member 30 fully against the extension member 56, including a slight flexing of the gate 30. Upon reverse rotation of the lever arm 33, the gate 30 is released, allowing the gate 30 to return to its normal configuration. This is shown in FIG. 8. As seen in FIG. 8, the gate member 30, in the closed position, is firmly pressed against the back ribs 56b to firmly and securely lock the stop mechanism 20 to the fence 50. When the gate 30 first makes contact with the extension member 56 only a short movement of the lever 33 is required. In this position the stop mechanism 20 has already locked itself in position. This means that there is less chance of moving the stop mechanism 20 out of position during the locking operation. Because of this the lever 30 may be locked without losing the accurate positioning. Also, because the gate 30 bears against the extension member 56 at some distance from the cylinder 34, which is causing the gate 30 to move, the extension member 56 acts as a fulcrum creating a mechanical advantage for the eccentric creating even a more powerful locking action upon the fence 50.

The stop bar 41 may be rotated in and out of position as shown in FIG. 1. The phantom lines in FIG. 1 represent the stop bar 41 in a position so as not to interfere with any workpiece 81 from being passed along the fence 50. When in the down position, also as shown in FIG. 1, the stop bar plate 43 with the stop bar adjusting bolts 44 acts as an accurate gauge for stopping the workpiece 81 at a predetermined position, as read on the hairline 35. The stop bar 41 also has a hook member 41a that allows for the stop bar 41 to be lifted remotely by a stick or other elongate means. The heads 44a and 46a of bolts 44 and 46 are the surfaces that act as the stop for the workpiece 81, depending on which direction the workpiece 81 is positioned. As shown in FIG. 1, the head 44a would be the stop for the workpiece 81. Rotation of the two nuts 45 will allow for precise adjustment of the location of the head 44a. Because the bolts 44 and 46 are threaded, very minute increments of movement may be affected by simply rotating the bolts 44 or 46. The nuts 45 or 47 are then tightened to firmly lock the bolt 44 or 46 in position.

The upright member 55 provides for a verticle surface against which the workpiece 81 may be slid. However, since the upright surface 51 preferably has a low profile, such as only ⅜ of an inch in height, any workpiece that has a height higher than ⅜ of an inch may easily be picked up by grasping the workpiece 81 by the gap formed by the angle extension member 56 and the upright member 55. During repeated use of the power tool, sawdust and other debris is generated. Because of the angled nature of the extension member 56 the sawdust does not accumulate on the extension member 56 or the ruler 57 but slides down the extension member 56 to the bottom member 51. Further, the sawdust may be pushed into the groove 55d as the workpiece 81 travels along the bottom member 51. The dust seals 36 wipe any remaining sawdust off of the ruler 57 as the stop mechanism slides along the extension member 56. This further prevents sawdust from building up underneath the view plate 24, thereby interfering with the reading of the ruler 57 underneath the hairline 35. The angled nature of the extension member 56 allows for easy reading of the tape measure 57. Also, the stop bar may be easily flipped up to remove sawdust from the flat surface and then flipped down to resume cutting. It is not necessary to reset the stop. This can be done on either fence 50 or 60.

The operation of stop mechanism 70 on fence 60 is similar to that of the stop mechanism 20 on fence 50.

It is often necessary to cut a workpiece a length that is shorter than the work place provided with the power tool. If that is the case, the rulers 57 and 52 would not be useful in that they would not extend on to the work place of the power tool. That is to say, if the work place of the power tool was ten inches in length, the closest the fence 50 could come to the working head would be ten inches. Therefore, if a five inch piece was to be cut, the stop mechanism of the present invention could not be used unless the extension bar assembly of FIG. 9 is also used. The collar 89 is set at a distance, measured from the downwardly depending portion 88a, equal to the length of the workpiece surface to the working head. If that distance was ten inches, the ruler 57 would have initially been set to read ten inches when the head 44a was even with the end of the fence. If a cut of five inches is to be made, the hairline is simply moved over to the fifteen inch mark and, with the ten inch extension rod, would allow for the downwardly depending portion 88a to act as a stop for the workpiece 81 being cut. This would then yield a cut of five inches as required. With such an extension bar assembly, it is not necessary to have ones hands close to the blade while cutting.

Other modifications of the invention will be apparent to those skilled in the art in light of the foregoing description. This description is intended to provide specific examples of individual embodiments which clearly disclose the present invention. Accordingly, the invention is not limited to these embodiments or to the use of elements having specific configurations and shapes as presented herein. All alternative modifications and variations of the present invention which follows in the spirit and broad scope of the appended claims are included.

I claim:

1. A workpiece stop mechanism for use with a fence for power tools, the fence having a measuring device extending along the length of the fence, said mechanism comprising:
   (a) a body member defining an opening for enabling said body member to be inserted on and removed from the fence and for sliding on the fence;
   (b) said body member having a view plate cooperatively connected thereto for viewing the measuring device;
   (c) means for stopping the workpiece, said stopping means cooperatively connected to said body member;
   (d) means for securing said body member to the fence, said securing means comprising:
      (i) a gate member pivotally mounted to said body member proximate said opening; and
      (ii) means for pivoting said gate member between an open position and a closed position, wherein when in said closed position said gate is engaged with the fence and thereby securing said gate and said body to the fence; and
   (e) wherein said view plate is positioned over the measuring device and said view plate further comprises a dust wiper cooperatively connected thereto, wherein when said stop mechanism slides along the fence, said dust wiper engages the measuring device and wipes off any dust, thereby preventing dust from entering under said view plate as it passes over the measuring device.

2. The stop mechanism of claim 1, wherein said pivoting means comprises:
   (a) an eccentric pivotally mounted to said housing; and
   (b) a lever arm cooperatively connected to said eccentric, wherein rotation of said lever arm rotates said eccentric causing said gate to rapidly and securely engage the fence.

3. The stop mechanism of claim 1, wherein said stopping means comprises a stop bar pivotally mounted to said housing and a stop bar plate cooperatively connected to said stop bar.

4. The stop mechanism of claim 3, further comprising adjustment means cooperatively connected to said stop bar plate.

5. The stop mechanism of claim 3, further comprising a hook member cooperatively connected to said stop bar, wherein said stop bar may be lifted and cause said stop bar to pivot.

6. A workpiece stop mechanism for use with a fence for power tools, the fence having a measuring device extending along the length of the fence, said mechanism comprising:
   (a) a body member defining an opening for enabling said body member to be inserted on and removed from the fence and for sliding on the fence;

(b) said body member having a view plate cooperatively connected thereto for viewing the measuring device;

(c) means for stopping the workpiece, said stopping means cooperatively connected to said body member;

(d) means for securing said body member to the fence, said securing means comprising:

(i) a gate member pivotally mounted to said body member proximate said opening; and (ii) means for pivoting said gate member between an open position and a closed position, wherein when in said closed position said gate is engaged with the fence and thereby securing said gate and said body to the fence; and (e) wherein said body member has protruding flange members on both sides of said view plate, wherein said view plate is protected from damage.

7. A workpiece stop mechanism for use with a fence for power tools, the fence having a measuring device extending along the length of the fence, said mechanism comprising:

(a) a body member defining an opening for enabling said body member to be inserted on and removed from the fence and for sliding on the fence;

(b) said body member having a view plate cooperatively connected thereto for viewing the measuring device;

(c) means for stopping the workpiece, said stopping means cooperatively connected to said body member;

(d) means for securing said body member to the fence, said securing means comprising:

(i) a gate member pivotally mounted to said body member proximate said opening; and (ii) means for pivoting said gate member between an open position and a closed position, wherein when in said closed position said gate is engaged with the fence and thereby securing said gate and said body to the fence; and (e) further comprising an extension bar assembly cooperatively connected to the stop bar, said extension bar assembly comprising:

(i) a sleeve member having a bore, said bore cooperatively connected to said stop bar;

(ii) a rod for insertion into said bore, said rod having a downwardly depending portion for use as a stop; and (iii) means for indicating a distance from the end of the depending portion wherein when said determining means contact said rod, said depending portion is a set distance from said sleeve.

8. A workpiece stop mechanism for use with a fence for power tools, the fence having a measuring device extending along the length of the fence, said mechanism comprising:

(a) a body member defining an opening for enabling said body member to be inserted on and removed from the fence and for sliding on the fence;

(b) said body member having a view plate cooperatively connected thereto for viewing the measuring device, said body member having protruding flange members on both sides of said view plate, wherein said view plate is protected from damage;

(c) means for stopping the workpiece, said stopping means cooperatively connected to said body member, said stopping means comprising a stop bar pivotally mounted to said housing and a stop plate cooperatively connected to said stop bar;

(d) an adjustment means cooperatively connected to said stop bar plate;

(e) a hook member cooperatively connected to said stop bar, wherein said stop bar may be lifted and cause said stop bar to pivot;

(f) means for securing said body member to the fence, said securing means comprising:

(i) a gate member pivotally mounted to said body member proximate said opening; and (ii) means for pivoting said gate member between an open position and a closed position, wherein when in said closed position said gate is engaged with the fence and thereby securing said gate and said body member to the fence, said pivoting means comprising an eccentric pivotally mounted to said housing and a lever arm cooperatively connected to said eccentric, wherein rotation of said lever arm rotates said eccentric, causing said gate to rapidly and securely engage the fence; and (g) said view plate positioned over the measuring device and said view plate further comprising a dust wiper cooperatively connected thereto, wherein when said stop mechanism slides along the fence, said dust wiper engages the measuring device and wipes off any dust, thereby preventing dust from entering under said view plate as it passes over the measuring device.

9. A fence system for use with a power tool having a work surface, said fence system comprising:

(a) a generally planar elongated bottom member adapted to be secured to the work surface;

(b) an upright member, generally perpendicular to said bottom member, said upright member cooperatively connected to said bottom member, said upright member having a front side, back side and top portion;

(c) an extension member cooperatively connected to said top portion and extending generally upwards and away from said top portion toward said back side;

(d) first means for receiving a first measuring device in said extension member; and (e) second means for receiving a second measuring device in said fence system.

10. The fence system of claim 9, wherein said extension member extends upward at an angle from aproximately 30° to 60°.

11. The fence system of claim 9, wherein said extension member extends upward at an angle of approximately 45°.

12. The fence system of claim 9, wherein said bottom member extends generally in front of said front side of said upright member and functions as an elongate work surface and wherein said second receiving means is positioned in said bottom member.

13. A fence system with a workpiece stop mechanism for use with a power tool having a work surface comprising:

(a) a generally planar elongated bottom member adapted to be secured to the work surface;

(b) an upright member, generally perpendicular to said bottom member, said upright member cooperatively connected to said bottom member, said upright member having a front side, back side and top portion;

(c) an extension member cooperatively connected to said top portion and extending generally upwards and away from said top portion toward said back side;

(d) first means for receiving a first measuring device in said extension member;

(e) a body member defining an opening for enabling said body member to be inserted on and removed from said extension member and for sliding on said extension member;

(f) said body member having a view plate cooperatively connected thereto for viewing the first measuring device in said first receiving means;

(g) means for stopping the workpiece, said stopping means cooperatively connected to said body member; and (h) means for securing said body member to said extension member, said securing means comprising:
  (i) a gate member pivotally mounted to said body member proximate said opening; and
  (ii) means for pivoting said gate member between an open position and a closed position, wherein whenin said closed position said gate is engaged with said extension member and thereby securing said gate and said body to said extension member.

14. The fence system with a workpiece stop mechanism of claim 13, wherein said pivoting means comprises:
  (a) an eccentric pivotally mounted to said housing; and
  (b) a lever arm cooperatively connected to said essentric wherein rotation of said lever arm rotates said eccentric causing said gate to rapidly and securely engage the said extension member.

15. The fence system with a workpiece stop mechanism of claim 13, wherein said view plate is positioned over the first measuring device and said view plate further comprises a dust wiper cooperatively connected thereto, wherein when said stop mechanism slides along said extension member, said dust wiper engages the first measuring device and wipes off any dust, thereby preventing dust from entering under said view plate as it passes over the first measuring device.

16. The fence system with a workpiece stop mechanism of claim 13, wherein said stopping means comprises a stop bar pivotally mounted to said housing and a stop bar plate cooperatively connected to said stop bar.

17. The fence system with a workpiece stop mechanism of claim 16, further comprising adjustment means cooperatively connected to said stop bar plate.

18. The fence system with a workpiece stop mechanism of claim 16, further comprising a hook member cooperatively connected to said stop bar, wherein said stop bar may be lifted and cause said stop bar to pivot.

19. The fence system with a workpiece stop mechanism of claim 13, wherein said body member has protruding flange members on both sides of said view plate, wherein said view plate is protected from damage.

20. The fence system with a workpiece stop mechanism of claim 13, wherein said first measuring device is graduated in increasing increments in a first direction and said second measuring device is graduated in increasing increments in an opposite direction.

21. A workpiece stop mechanism for use with a fence for power tools, the fence having a measuring device extending along the length of the fence, said mechanism comprising:
  (a) a body member defining an opening for enabling said body member to be inserted on and removed from the fence and for sliding on the fence;
  (b) said body member having a view plate cooperatively connected thereto for viewing the measuring device;
  (c) means for stopping the workpiece, said stopping means cooperatively connected to said body member;
  (d) means for securing said body member to the fence, said securing means comprising:
    (i) a gate member pivotally mounted to said body member proximate said opening; and
    (ii) means for pivoting said gate member between an open position and a closed position wherein when in said closed position said gate is engaged with the fence and thereby securing said gate and said body to the fence; and
  (e) said pivoting means comprising:
    (i) an eccentric pivotally mounted to said housing; and
    (ii) a lever arm cooperatively connected to said eccentric, wherein rotation of said lever arm rotates said eccentric causing said gate to rapidly and securely engage the fence, said gate first contacts the fence at a distance from said eccentric thereby forming a fulcrum creating a further mechanical advantage.

* * * * *

UNITED STATES PATENT AND TRADEMARK OFFICE
CERTIFICATE OF CORRECTION

PATENT NO. : 4,693,158
DATED : September 15, 1987
INVENTOR(S) : T. David Price

It is certified that error appears in the above—identified patent and that said Letters Patent are hereby corrected as shown below:

The title page should be deleted to appear as per attached title page.
The sheets of Drawing consisting of Figures 1-11 should be deleted to appear as per attached Figures 1-11.

Signed and Sealed this

Thirty-first Day of May, 1988

Attest:

DONALD J. QUIGG

Attesting Officer

Commissioner of Patents and Trademarks

United States Patent [19]
Price

[11] Patent Number: 4,693,158
[45] Date of Patent: Sep. 15, 1987

[54] FENCE SYSTEM WITH A STOP MECHANISM

[76] Inventor: T. David Price, 648 Turin St., S. St. Paul, Minn. 55075

[21] Appl. No.: 855,844

[22] Filed: Apr. 24, 1986

[51] Int. Cl.⁴ ............................................. B27B 27/10
[52] U.S. Cl. ........................................ 83/468; 83/698; 144/253 R; 144/287; 269/303
[58] Field of Search .................. 83/467, 468, 698; 269/303, 304, 236, 315; 144/253 R, 287

[56] References Cited

U.S. PATENT DOCUMENTS

| | | | |
|---|---|---|---|
| 2,498,865 | 2/1950 | Snow | 83/468 |
| 2,747,625 | 5/1956 | Small | 143/174 |
| 2,779,360 | 1/1957 | Snow | 144/253 R |
| 2,787,301 | 4/1957 | Anderson | 83/468 |
| 2,890,729 | 6/1959 | Horn | 143/168 |
| 3,348,591 | 10/1967 | Carrasco | 143/168 |
| 3,994,484 | 11/1976 | Scherr | 269/315 |
| 4,206,910 | 6/1980 | Biesemeyer | 269/315 |
| 4,256,000 | 3/1981 | Seidel | 83/468 |
| 4,341,247 | 4/1982 | Price | 144/287 |
| 4,494,430 | 1/1985 | Bautista et al. | 83/468 |

OTHER PUBLICATIONS

Brochure "T-Square Cut-Off Saw Stop", Biesemeyer Mfg. Corporation, 216 S. Alma School Rd., Suite 3, Mesa AZ 85202.
Brochure "Leaver Index/Stop Gauge", Idaco, 1300 7th Street, Oakland, CA 94607.
Brochure "Simi-Automatic Cut-Off Saw Model 1000", Whirlwind, Inc., 4302 Shilling Way, Dallas, TX 75237.

*Primary Examiner*—W. D. Bray
*Attorney, Agent, or Firm*—Merchant, Gould, Smith Edell, Welter & Schmidt

[57] ABSTRACT

A workpiece stop mechanism (20, 50) for use with a fence (50, 60), is disclosed. The stop mechanism (20) includes a body member defining an opening for enabling the body member to be inserted on and removed from the fence (50) and for sliding on the fence (50). The body member has a view plate (24) that is cooperatively connected for viewing a measuring device (57). A gate member (30) and eccentric (31) provide for pivoting the gate member between an open and closed position wherein when in the closed position the gate (30) is engaged with the fence (50) and thereby securing the gate (50) and body to the fence (50). The fence (50) includes a body member (51) adapted to be secured to a work surface and an upright member (55) cooperatively connected to the bottom member (51). An angled extension member (56) is cooperatively connected to a top portion (55c) at an angle from approximately 30° to 60° and preferably at an angle of approximately 45°.

21 Claims, 11 Drawing Figures

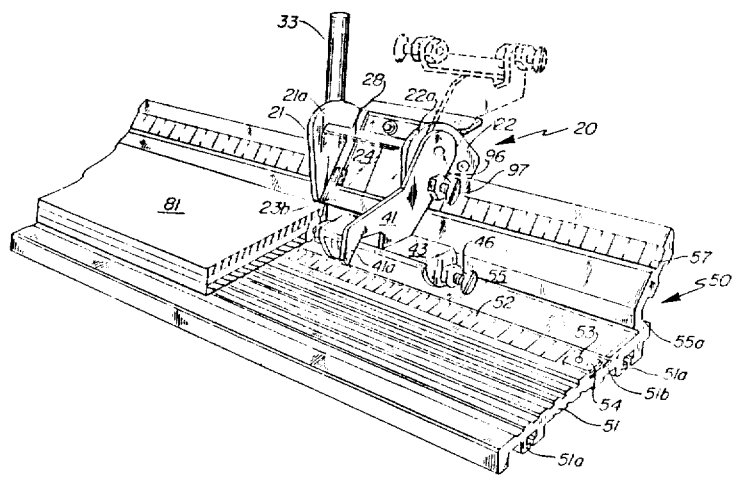

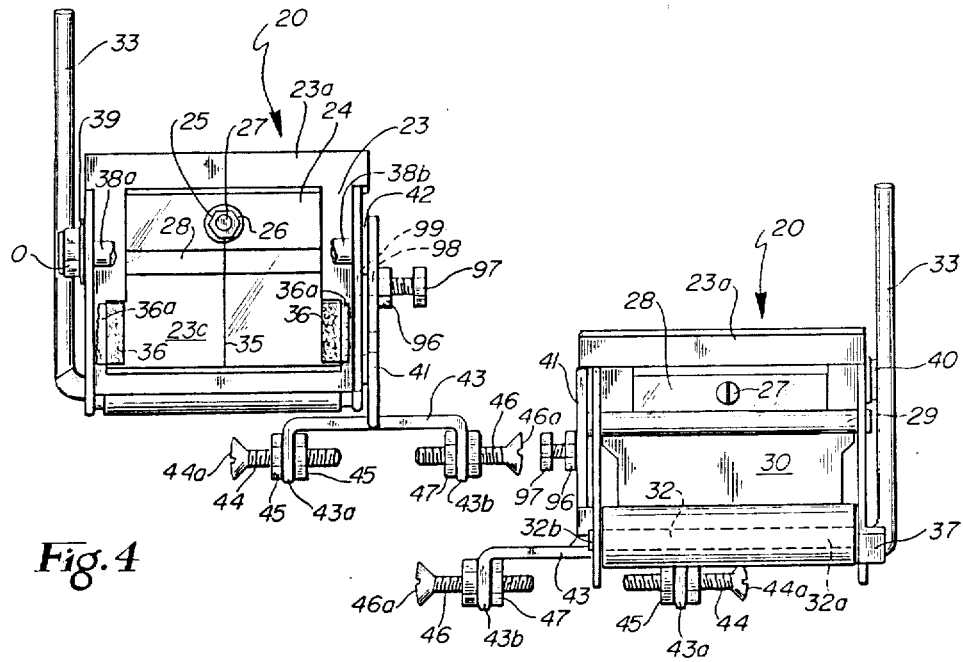
Fig. 4
Fig. 5
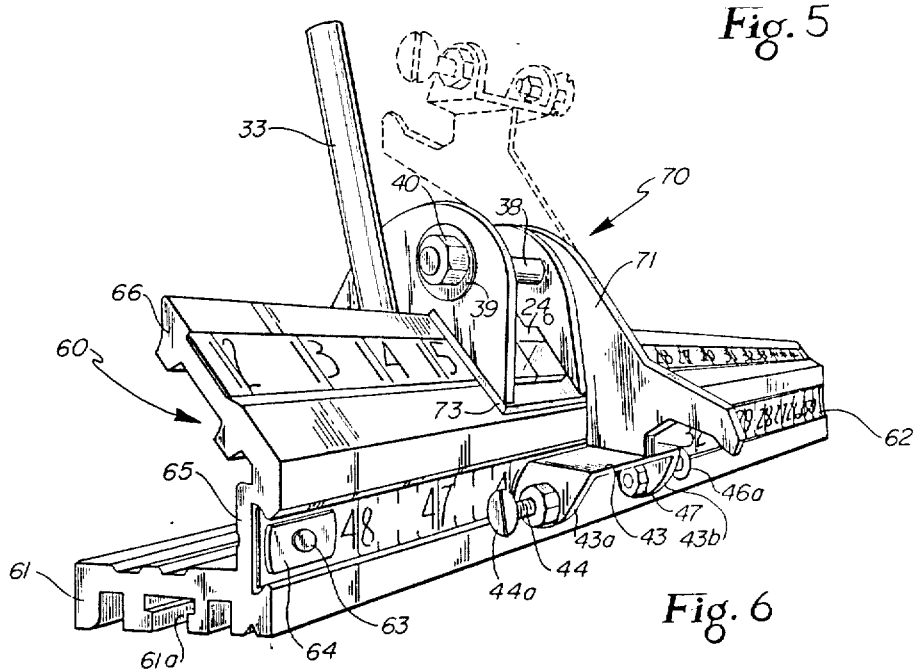
Fig. 6